United States Patent [19]

Randolph

[11] Patent Number: 5,113,589
[45] Date of Patent: May 19, 1992

[54] FOOTBALL EXACT YARD MARKER AND METHOD FOR USE

[76] Inventor: Philip Randolph, 530 E. 115 Noerh, Salem, Utah 84653

[21] Appl. No.: 653,297

[22] Filed: Feb. 11, 1991

[51] Int. Cl.⁵ .................. G01C 15/00; A63B 67/00
[52] U.S. Cl. ........................................ 33/289; 33/295; 273/55 R; 356/401
[58] Field of Search .............. 33/289, 286, 290, 295; 273/55 R; 356/401

[56] References Cited

U.S. PATENT DOCUMENTS

| | | | |
|---|---|---|---|
| 2,795,853 | 6/1957 | Benfield, Jr. et al. | 33/289 |
| 3,181,241 | 5/1965 | Middleton | 33/289 |
| 3,186,092 | 6/1965 | Bertas | 33/289 |
| 3,300,861 | 1/1967 | Lilly | 33/289 |
| 3,482,317 | 12/1969 | Truax | 33/289 |
| 3,608,199 | 9/1971 | Hunt | 33/289 |
| 3,738,014 | 6/1973 | Sproul, Sr. | 33/289 |
| 3,985,356 | 10/1976 | Carlock | 33/289 |

Primary Examiner—William A. Cuchlinski, Jr.
Assistant Examiner—Christopher Fulton

[57] ABSTRACT

A device for making the location of a football on a football field comprising a large view container having two opposite sides containing see through material and having a vertical line on both sides of the see through material, a spirit level under the container to indicate the levelness of the container, a vertical stand which holds up and is attached to the container, the stand having a vertical white line down the center such that it can be seen from the opposite side of the field, a pointed end for the stand, and a smaller container on the other side of the field so that by looking through the vertical lines they can eye up a line across the field, and a process for using the new device to insure the proper location of the football when it is moved by the referee.

6 Claims, 6 Drawing Sheets

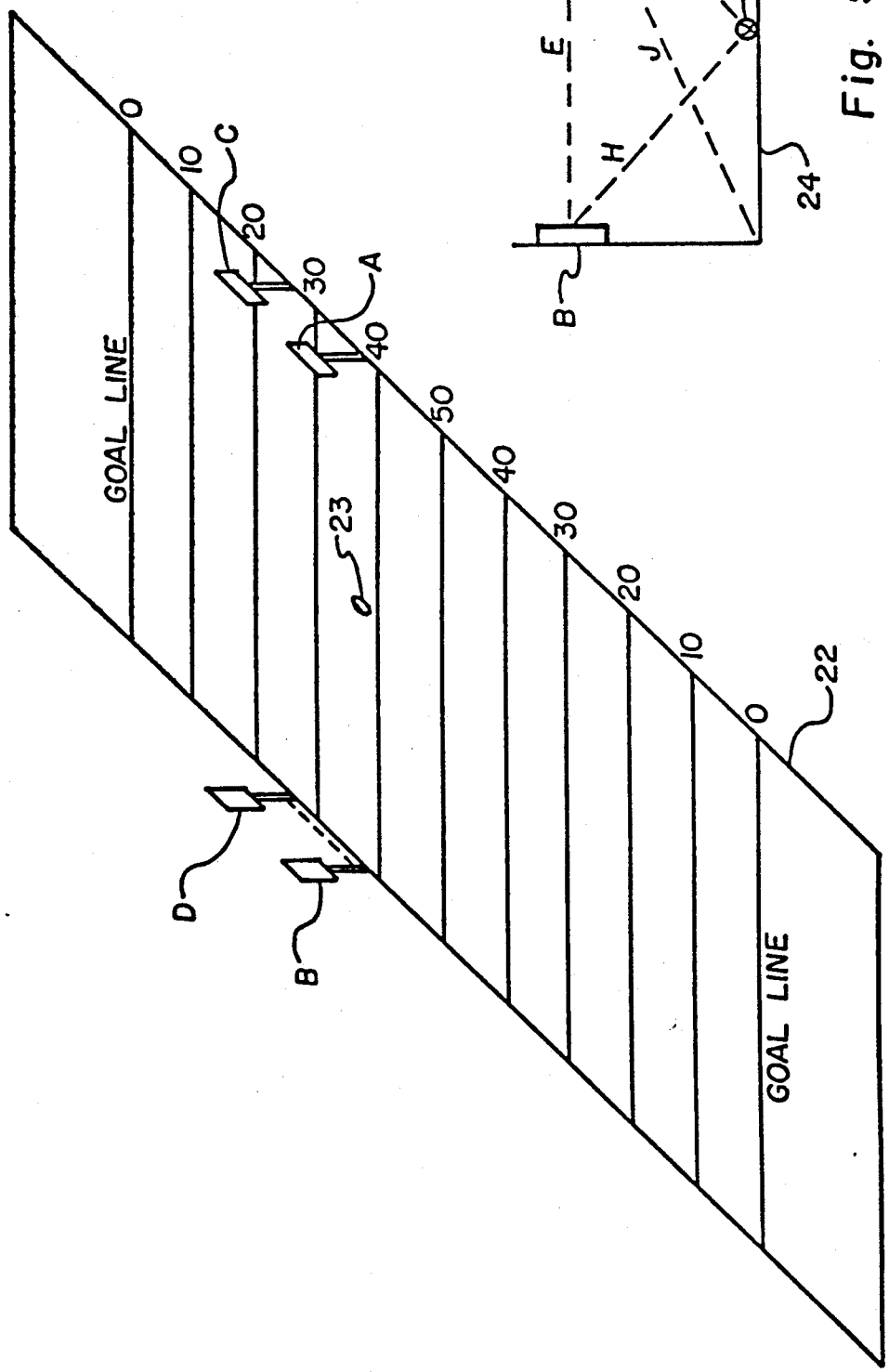

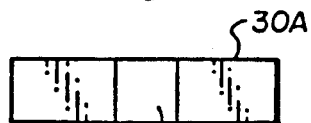
Fig. 6
Fig. 7
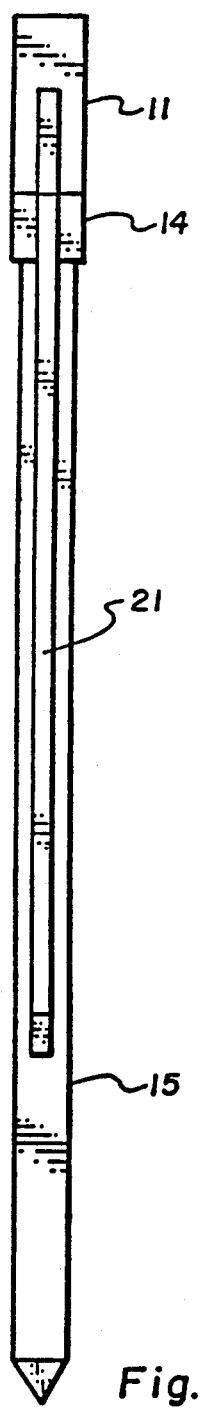
Fig. 8
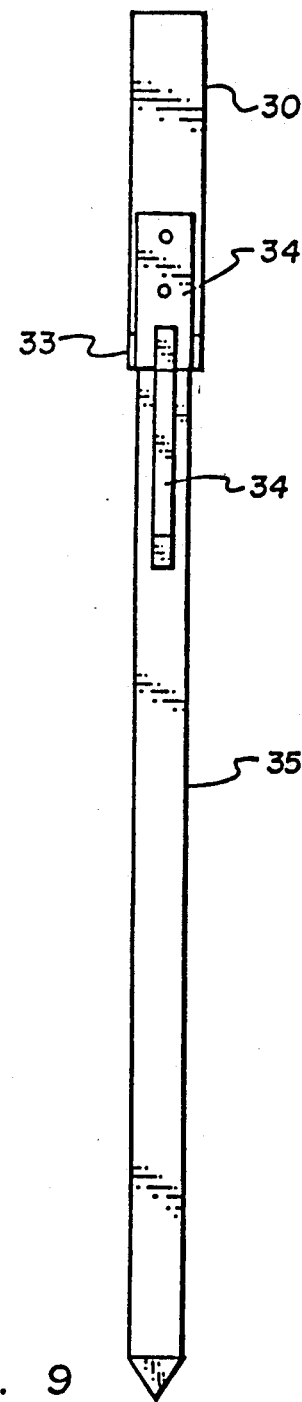
Fig. 9

FOOTBALL EXACT YARD MARKER AND METHOD FOR USE

BACKGROUND OF THE INVENTION

1. Field of the Invention

This invention relates to a football exact yard marker. More particularly, the invention relates to a device for placing the football in the exact position on the football field after a ball has been called back, a penalty has been assessed, etc.

Specifically, the invention provides a device for location of a football on the field in the exact place required. The new device comprises a 36 inch view container having two opposite sides containing see through material and have a vertical line on both sides of the see through material lined up exactly together, said see through material having additional vertical lines about 1 inch apart to aid in locating the box on the line markers, a spirit levelness under the view box to indicate the levelness of the box in relation to the field, a horizontal stand which holds up and is attached to the said view box, and said stand having a vertical white line at least about 2 feet down its center which can be seen from the opposite side of the field and black marked lines along both sides of the said white line, said stand also containing at the bottom a pointed end for sticking in the ground and chain connecting means on both sides of the stand for connecting chains thereto.

The invention further provides a process for using the above-noted new devices.

2. Prior Art

During a football game, the referee often moves the football from one place to another. In many cases, the ball is moved just by the referee stepping of the necessary yardage. This leaves a great deal of opportunity for making errors in the placement of the ball. Such errors may be very vital to the outcome of the game. It would be a great improvement to find a method for exact measuring of the distance the ball is moved.

Several methods have been proposed in the past, such as for example, methods shown in U.S. Pat. No. 3,300,861, U.S. Pat. No. 2,576,321, and U.S. Pat. No. 2,869,238. These methods, however, have been difficult to operate or have not been successful in accomplishing the desired result.

It is an object of the present invention to provide a new and different method of placing the football in the football field in the exact spot required. It is a further object to provide a device for use in placing the football in the exact spot indicated by the referee. It is a further object to provide a device for accomplishing the same.

SUMMARY OF THE INVENTION

It has now been discovered that these and other objects may be accomplished by the new devices covered by the present invention and a method for its use.

The new device comprises a 36 inch view container having two opposite sides containing see through material and having a vertical line on both sides of the see through material lined up exactly together, said see through material having additional vertical lines about 1 inch apart to aid in locating the box on the line markers on the field, a spirit level under the view box to indicate the levelness of the box in relation to the field, a vertical stand which holds up and is attached to the said view box, and said stand having a vertical white line at least about 2 ft. down its center which can be seen from the opposite side of the field and black marked lines along both sides of the white line, said stand also containing at the bottom a point end for sticking in the ground and chain connecting means on both sides of the stand for connecting chains thereto.

DESCRIPTION OF THE DRAWINGS

The various objects and features of the present invention will be more fully understood by reference to the accompanying drawings. These drawings illustrate the superior and more accurate results obtained by the use of the present invention.

FIG. 4 illustrates an example of the positioning of the view boxes on the football field,
FIG. 5 is an illustration of the view of sight using the view boxes,
FIG. 6 is a view of the top of the larger view box and
FIG. 7 is a view of the top of the smaller view box,
FIG. 8 is a side view of the larger view box and
FIG. 9 is a side view of the smaller view box.

With reference to FIG. 1, the whole larger view box is shown as 10, the enclosed container is shown as 11, the red sighting line is shown as 12, with the black lines 1 inch apart is shown and illustrated as line 13, the box containing the spirit level is shown as 14. The stand holding up the view box is shown as 15, the black lines on the front of the stand are illustrated as 16, and 18 and the white line indicator is shown as 17. The braces to hold up the view box are shown as 21, the eyelets for introducing the side chain are shown as 19 and the point of the stand to go into the ground is shown as 20.

With reference to FIG. 2, the whole smaller box is shown as 30, with the view container box as 30A, the red sighting line is shown as 31 with the black lines 1 inch apart are shown as 32. The box for the level is shown as 33, the stand is shown as 35 with the black line on the stand as 36 and the white line as 37. The braces for the sight box are shown as 34. Eyelet is 38.

With reference to FIG. 3 which is a modified larger view box which has been extended downward in case the operator cannot see through the larger box above. The box is shown as 40 with the container as 41, the red line marker is shown as 41B. The extention of the box is shown as 42. The box for the level is shown as 42B. The stand is shown as 45A the black lines on the stand are shown as 45. The white line between the black line is shown as 46. The braces for the extension are 44 and the braces for the larger box is 43. The eyelets for the chain are shown as 19 and the chain as 19A.

With reference to FIG. 4, the football field is shown as 22. The larger view boxes are shown as A and C and the smaller boxes on the other side are shown as B and D. The ball is shown as 23.

With reference to FIG. 5, the sighting from the boxes are shown as dotted lines. The line from the larger box to the yard marker is shown as F, the line from the larger box to the ball is shown as line G, the line from one box to the other is shown as line E. The line from the smaller box to the ball is shown as line H. The line from the larger box the other side line is shown as line J and E. Ball is shown as 23 and the line of the field is shown as 24.

With reference to FIG. 6 which is a top view of the larger box 11, the end of the stand is shown as 15.

With reference to FIG. 7 which is the top view of the smaller view box 30A, the end of the standing holding up the box is shown as 35.

With reference to FIG. 8 which is a side view of the larger view box, the container is shown as 11, the place for the level as 14, the brace as 21 and the stand as 15.

With reference to FIG. 9 which is a side view of the smaller view box, the container is shown as 30, the box for the level as 33, the brace as 34 and the stand as 35.

With reference to FIG. 10, which shows the locating of the larger view box in relation to the yard markers, the line of the field is shown as 51, the line markers is shown as 50, the line markers used to adjust the larger view box is shown as lines 53 and 54, the view box is shown as 56 with the black line used for the adjustment as lines 55 and 52.

With reference to FIG. 11, this is an extra spike or stand used to take the place of the view box stand when it is moved. The spike is 58, with the eyelets for the chain as 59.

DETAILED DESCRIPTION OF THE INVENTION

Figure 1:
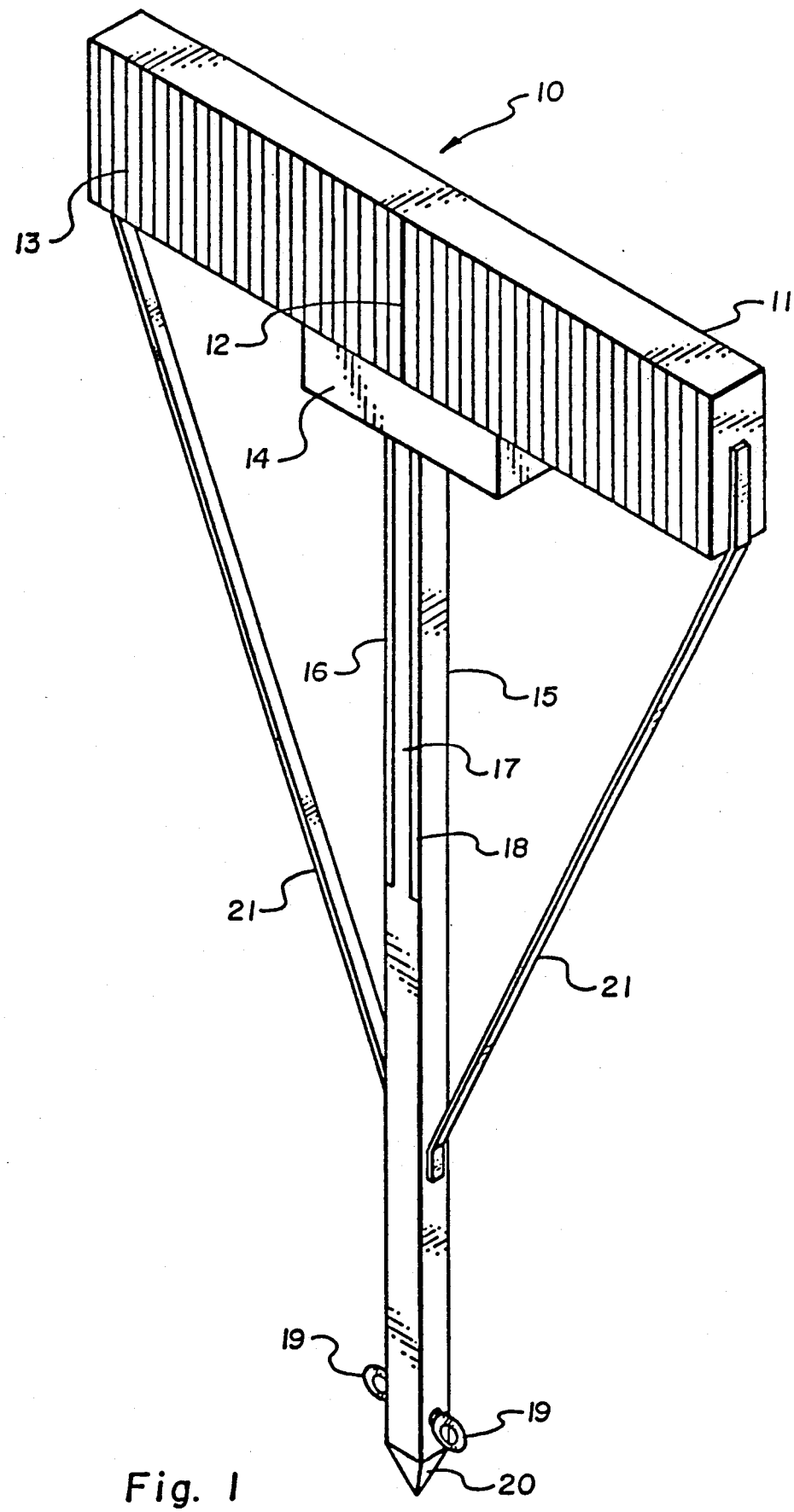
FIG. 1 is a perspective view of the large view box.
Figure 2:
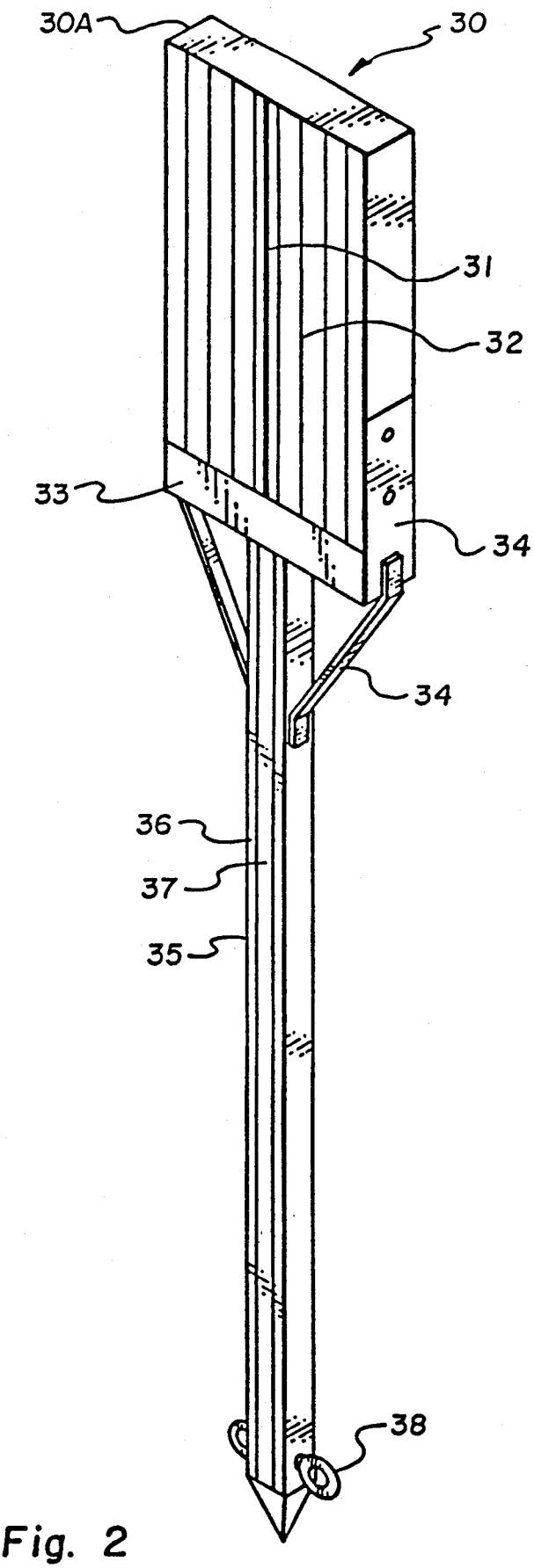
FIG. 2 is a perspective view of the smaller view box.
Figure 3:
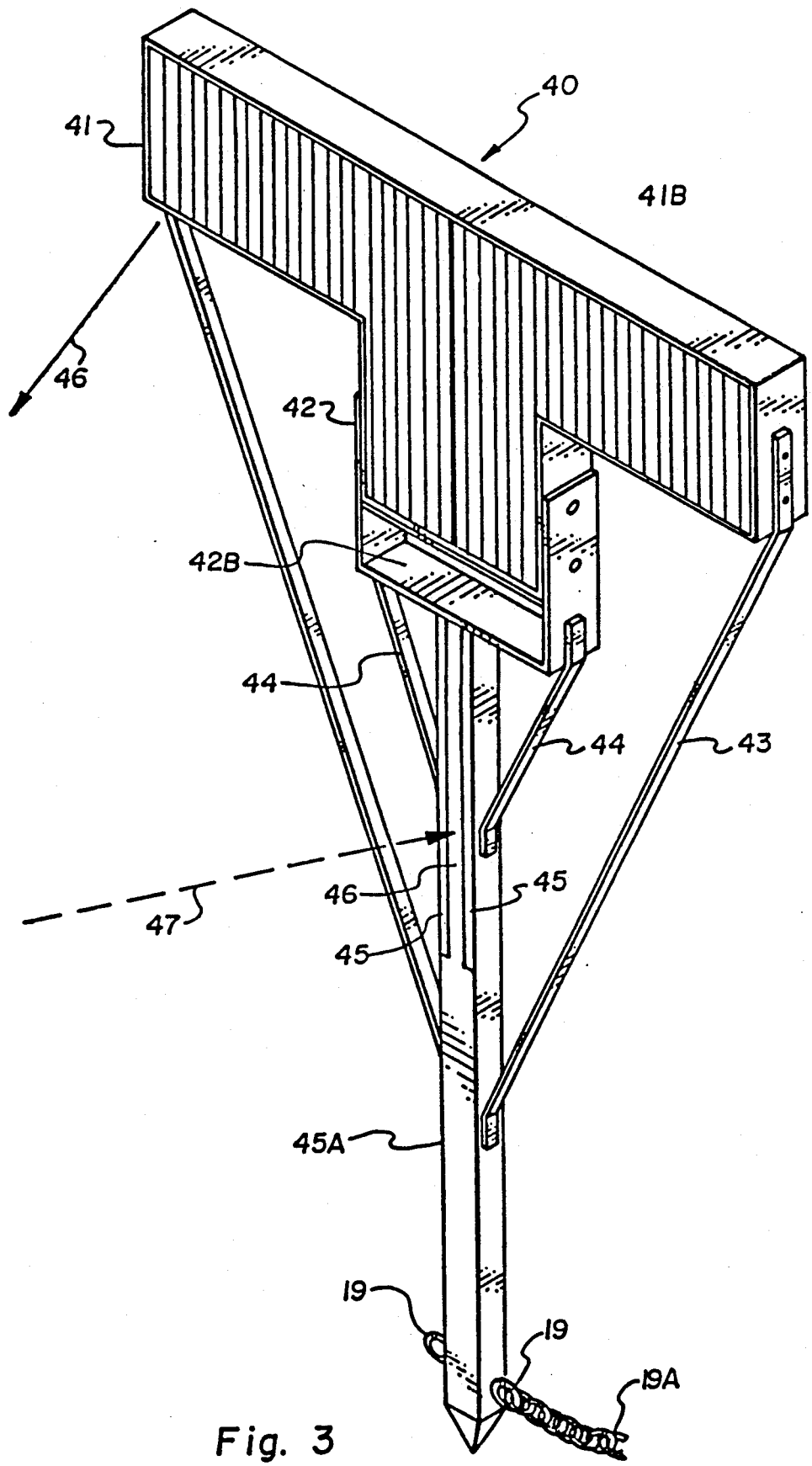
FIG. 3 is a perspective view of a modified larger view box.
Figure 10:
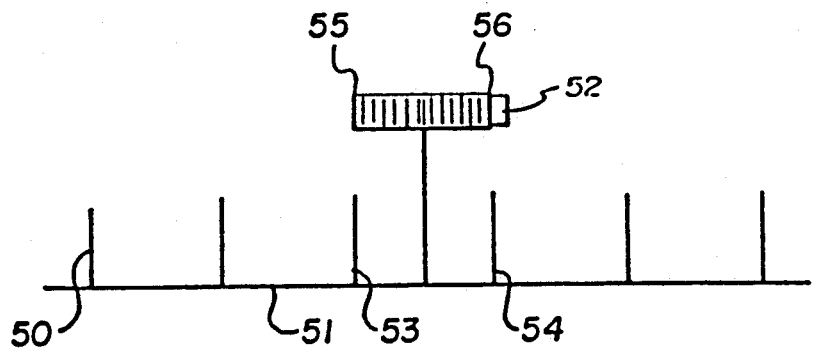
FIG. 10 illustrates the location of the larger view box between the yard markers.
Figure 11:
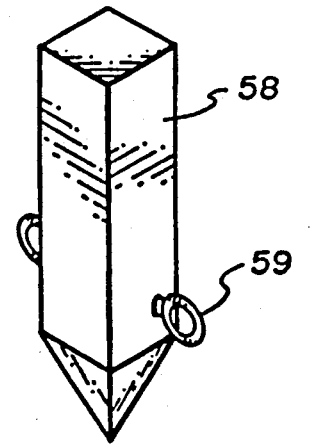
FIG. 11 is an example of an extra marker.

The invention is a yard marker that has a viewbox with two see through windows. A football can be easily seen through these windows because of their width and height. These two windows have parallel lines that are vertical. The lines begin with a red center line in the box with a black line on each side being about one half inch apart from the red center line. The black lines on each side are one inch apart to the box ends which are eighteen inches from center lines making the box 36 inches long. There also may be a one foot line one foot from the red center line on both sides which are red lines also. This means there will be black lines on both sides of the red lines.

Both windows are exactly alike so the parallel lines are matching each other. The windows are a distance apart e.g. three inches.

The lines in the windows line up so when the football is placed on the field it will be in the exact spot in case the football is moved because of a play and has to be put back in the same spot.

Looking through the windows and lining up the lines in the box is like aiming a gun looking down the sights so it can't miss.

Preferably the box is 36 inches across the top and about 8 inches down then it comes in 13 inches and down 10 inches to the base of the box on both sides. This means it is shaped like a T. There will be 2 yardsticks with a T shaped box on one side of the field both being exactly alike as was explained above.

There will be a 5 yard, a 10 yard, and a 15 yard measuring chain used between these 2 yardsticks and they are detachable from the sticks.

Below the red center line in the box is a level mounted on the frame so the yardstick is straight up and down.

The tops of the large boxes are 36 inches across and the reason for this is to line the parallel lines in the box with the one yard markers on the football field. The box will be square with the football field. The football field has 5 yard markers across it and there are one yard markers between the 5 yard markers.

The two box sticks are used to measure the exact distance the football has to be moved by the offensive team with the football.

In a football game a team has 4 downs to advance the football 10 against an opposing team. If not they punt the ball to the opposing team generally on the 4th down. Now they are the offensive team going in the opposite direction beginning on the yard line where the official placed the football.

A football game is started when an offensive team kicks the ball to the opposing team who are then on the offense.

The football is placed on the field by the official where the player with the football was stopped by the opposing team.

The box stick is placed (1) where the point of the football lines up with both the red center line in the box and with any football field line marker as shown in FIG. 5, line F. This will square the box with the field and the ball will be placed at the exact spot.

A 10 yard measuring chain hooks in a loop on the base of the stick and the other end of the chain is hooked in the loop of the other box stick. This box stick is also squared with the field level and stays in the same spot unless the football is advanced beyond the 10 yard marker. If the football is advanced so close to the 10 yard box marker the head linesman looks through the window in the box to see how close the football is to the red center line. This will determine exactly how near the football is to the red center line for a first down or another down to advance the football unless that play was a 4th down, but if it crossed the red center line the box shows it was a 1st down. If a team takes a football and tries to advance it but there is a penalty against them or the opposing team and the penalty has to be marked off an extra stick without a box, but has loops at the base, is provided. The extra stick is placed in front of the box stick.

If the penalty is 5-10- or 15 yards the yardage chain is used to measure the yardage penalized. The chain hooks to the loop of the extra stick which stays in the same spot where the box stick was. The chain is hooked to the box stick and measured the penalized distance. The chain is removed from the box and the extra stick. The stick is removed from the spot and the box stick is now placed in the right spot where the tip of the football is placed even with the parallel center lines in the box. The box stick is leveled and squared with the football field. The penalty would give the offensive team more or less yardage to gain on the next play.

The chain can be removed when the football is properly spotted with the box sticks. In the event one of the box sticks has to be moved because a player is forcing the box stick person to move the box stick, the lineman official could instruct the person with the extra stick to put it in the spot where the box stick was until he can return and replace the box stick in the same spot.

Each box stick has a mark on the side facing the football field. The mark is about 24 inches down the stick that can be seen across the playing field. It is black on the outside with white in the middle so it can easily be seen.

Across the field 2 sticks with smaller boxes that are rectangular in shape with vertical and parallel lines are also located. They have a red center line and black lines on each side 1 inch apart. The two center black lines are 1 inch from the center red line. The smaller box sticks also have a level beneath the box mounted on the frame and about a 24 inch mark below the level. The mark is 24 inches down the stick that can be seen across the playing field. It is black on the outside with white in the middle so it can easily be seen. This marker faces the football field and has 2 windows in each box so the lines are lined up with each other like the lines in the bigger box.

The smaller box sticks have loops at the base in case they may be needed for a measurement.

The smaller boxes are facing the bigger boxes across the playing field and can be placed exactly square with the ball by putting the red center lines at tip of the football. The center marker on the big stick which is already lined up with the ball and yard stripes. It can mark the ball where it should be in case the big box stick is moved and the extra stick could not find the exact spot where the big stick was placed.

Sometimes a team is close to the end zone and may be penalized half the distance to the goal line. These measuring chains will be marked at ½ yard and 1 yard intervals to place the football half the distance to the goal.

Every stick has a pointed end that will stay where it is placed and all materials are light safe and durable.

An extra stick without a box is provided for added measurement. The Large box will rest on light tubing in the center of the box, with braces connected to the box frame beside the level and 1 foot below the level on the tubing. Braces will connect to the top of the box down to 18" above ground level. The bottom will be pointed to stay where positioned and the total height should be about 72 inches.

The small box will rest on tubing about 58 inches above the ground level with braces from the side of the box to 54 inches above the ground. The bottom will be pointed to stay where positioned also. The height will be 72 inches also.

The third stick will be about 62 inch tubing with a pointed end. All will have hand grip area and marks on the sticks are in the center of the tubing just below the levels measuring 24 inches.

Boxes are made of light material so as not to weigh too much but to be very durable. Tubing will be 1½ inch light material but durable. The top cover for boxes will be plastic for a quick change.

Loops to hook chains to sticks are about 3 inches above ground level.

The advantages of the present invention are:

1—The view boxes are mounted on aluminum bases so they will be sturdy and dependable for a long time. There are no moving parts to worry about that could delay a game. They are inexpensive, and easy to use and will make it easier to keep up with the game.

2—The view boxes do not block the view of the person holding the stick in it's place nor will it hinder the view of others since it is clear plastic.

3—The view box is the yard marker for a football game that is exact in the measurements whether it is 5-10 or 15 yards. The box is square with playing field, it is level and the parallel lines will show exactly where the ball should be placed.

4—The view box will spot the ball at the exact spot when a period of 15 minutes (¼) has expired and the ball is moving in the opposite direction for the next quarter. The ball will be placed on the opposite side of the 50 yard line (which is the center line of the playing field) on the exact yard line it was on before the quarter ended.

5—The view box stick can be detached from the measuring chain after the yardage has been measured. This will be safer for a player or players who run out of bounds on a play because the chains are removed. If a stick has to be moved the official has the chain man put the extra stick in the same spot the view box stick was at until he can return to replace the view box. A delegated person could carry the 5-10-15 yard chains and the extra measuring stick.

6—The view box sticks work in conjunction with each other in measuring, viewing and placing the football at exactly the right spot so the field official can do a more perfect and easier job. That's why the person with the view boxes on both sides of the field can watch the official when he calls a foul or where he places the ball after a play is finished or there is a foul to be measured. An out of bounds play can be taken out on the field and placed at the same yardage where it went out of bounds.

7—The large view boxes work in conjunction with the extra stick without a box. The extra stick is placed exactly where the view box stick was set. The right yardage chain is hooked to both the extra stick and the large view box stick which measures the exact yardage. Then the chain and the extra stick can be removed from the large view box stick.

8—The view box stick is pointed on the bottom so it will stay set in the right spot.

9—The view boxes are plastic and the square tube is aluminum. The tube is painted 24 inches down from the level on all the view boxes, In the middle is white so they are easy to see and lined up with the others. Two black Stripes ¼ inch are on each side of the white line which is 1 inch wide.

10—Other than the lines on the see through sides, there is nothing in the view box to complicate things.

I claim as my invention:

1. A device for marking the location of a football on a football field comprising a 36 inch view container having two opposite sides containing see through material and having a vertical line on both sides of the see through material lined up exactly opposite each other, said see through material having additional vertical lines about 1 inch apart to aid in locating the container on the yard side markers and thus keeping it straight, a spirit level under the container to indicate the levelness of the container in relation to the field, a vertical stand which holds up and is attached to the said container, and said stand having a vertical white line existing at least two feet down the center of the standing facing toward the field which can be seen from the opposite side of the field, and black marker lines along both sides of the white line, said stand also containing at the bottom a pointed end for sticking in the ground and chain connecting means on both sidesof the stand for attaching chains thereon.

2. A device as in claim 1 wherein the first described vertical line is a red line and is the approximate middle of the see through sides.

3. A device as in claim 1 wherein braces are used to help support the container on the stand.

4. A device as in claim 1 wherein there are 15 yard chains attached to the connecting means.

5. A process for locating the exact place for footballs wherein the location of the football is being changed in location on the football field comprising (1) placing a view container containing see through sides and a vertical line running down the sides, on the sidelines directly opposite the football, (2) placing a smaller view container which is at the top of a stick having a chain at the bottom thereof, on the opposite side of the field and by eyeing through the vertical lines on the side of the containers locate the football in such line of sight, (3) when the football is being moved, placing a small mark in the hole containing the larger view container, measuring off on the chain attached to said smaller view container the exact distance needed, (4) placing the larger view container at the exact spot and eye a line across the field to the smaller view container through the vertical lines on the see through sides of the containers, and (5) having the referee place the football on the exact line of sight.

6. A process as in claim 5 wherein the ball is to be brought back to its original spot and the larger view container is brought back to the place where the smaller marker is placed and again eyed up with the smaller view container on the other side.

* * * * *